United States Patent
Mann et al.

(10) Patent No.: US 11,042,674 B2
(45) Date of Patent: Jun. 22, 2021

(54) ACOUSTIC EFFECTS OF A MESH ON A FLUID FLOW

(71) Applicant: Dassault Systemes Simulia Corp., Johnston, RI (US)

(72) Inventors: Adrien Mann, Palo Alto, CA (US); Chenghai Sun, Salem, MA (US); Hudong Chen, Newton, MA (US); Raoyang Zhang, Burlington, MA (US); Franck Léon Pérot, Arlington, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 381 days.

(21) Appl. No.: 15/729,216

(22) Filed: Oct. 10, 2017

(65) Prior Publication Data
US 2019/0108296 A1   Apr. 11, 2019

(51) Int. Cl.
*G06F 30/20* (2020.01)
*G06F 30/15* (2020.01)
*G06F 30/23* (2020.01)
*G06F 119/10* (2020.01)

(52) U.S. Cl.
CPC ............. *G06F 30/20* (2020.01); *G06F 30/15* (2020.01); *G06F 30/23* (2020.01); *G06F 2119/10* (2020.01)

(58) Field of Classification Search
CPC ............ G06F 17/5009; G06F 17/5018; G06F 17/5095; G06F 17/50; G06F 2217/82; G06F 30/20; G06F 30/15; G06F 30/23; G06F 30/00; G06F 2119/10
See application file for complete search history.

(56) References Cited

U.S. PATENT DOCUMENTS

| | | | |
|---|---|---|---|
| 5,594,671 | A | 1/1997 | Chen et al. |
| 6,221,258 | B1 | 4/2001 | Feke et al. |
| 9,037,440 | B2 | 5/2015 | Sun et al. |
| 2004/0059265 | A1 | 3/2004 | Candy et al. |
| 2005/0007109 | A1 | 1/2005 | Thomann et al. |

(Continued)

OTHER PUBLICATIONS

Fabmann, B.W. et al., "Prediction of Porous Training Edge Noise Reduction via Acoustic Perturbation Equations and Volume Averaging", Jun. 22-26, 2015, 21st AIAA/CEAS Aeroacoustics Conference, AIAA. (Year: 2015).*

(Continued)

*Primary Examiner* — Cedric Johnson
(74) *Attorney, Agent, or Firm* — Fish & Richardson P.C.

(57) ABSTRACT

The description describes one or more processing devices and one or more hardware storage devices storing instructions that are operable, when executed by the one or more processing devices, to cause the one or more processing devices to perform operations including modeling the porous material as a two-dimensional interface, in a simulation space, in which fluid flows and sound waves travel through the porous material and experience pressure and acoustic losses. The operations also include simulating, in the simulation space, fluid flow and propagation of sound waves, the activity of the fluid being simulated so as to simulate movement of elements within the simulation space and across the interface, where the simulation of the movement of the elements across the interface is governed by the model.

24 Claims, 10 Drawing Sheets

(56) References Cited

U.S. PATENT DOCUMENTS

| | | | | |
|---|---|---|---|---|
| 2011/0030467 A1* | 2/2011 | Bakulin | ............... | E21B 47/101 |
| | | | | 73/152.32 |
| 2013/0116997 A1* | 5/2013 | Sun | ..................... | G06F 17/5095 |
| | | | | 703/9 |
| 2017/0072638 A1 | 4/2017 | Hayes | | |
| 2018/0168457 A1* | 6/2018 | Ebisawa | ............. | A61B 5/0095 |

OTHER PUBLICATIONS

Park, Ju Hyuk et al., "Optimization of Low Frequency Sound Absorption by Cell Size Control and Multiscale Poroacoustics Modeling", Mar. 9, 2017, Journal of Sound and Vibration, 397, Elsevier, Ltd. (Year: 2017).*

Zielinski, Tomasz, ("Microstructure Representations for Sound Absorbing Fibrous Media: 3D and 2D Multiscale Modeling and Experiments", Aug. 12, 2017, Journal of Sound and Vibration 409, Elsevier Ltd. (Year: 2017).*

PCT International Search Report and Written Opinion to International Appln. No. PCT/US2018/55220, dated Dec. 31, 2018, 15 pages.

Dobrzynski; "Almost 40 Years of Airframe Noise Research: What Did We Achieve?"; Journal of Aircraft; vol. 47, No. 2, Mar.-Apr. 2010; 15 pages.

Dobrzynski; "Almost 40 Years of Airframe Noise Research: What Did We Achieve?"; DLR Institute of Aerodynamics and Flow Technology; 14$^{th}$ Aeroacoustics Conference, May 5-7, 2008; 37 pages.

International Preliminary Report on Patentability in PCT Appln. No. PCT/US2018/055220, dated Apr. 14, 2020, 7 pages.

Extended European Search Report in European Appln. No. 1886750, dated Oct. 30. 2020. 8 pages.

* cited by examiner

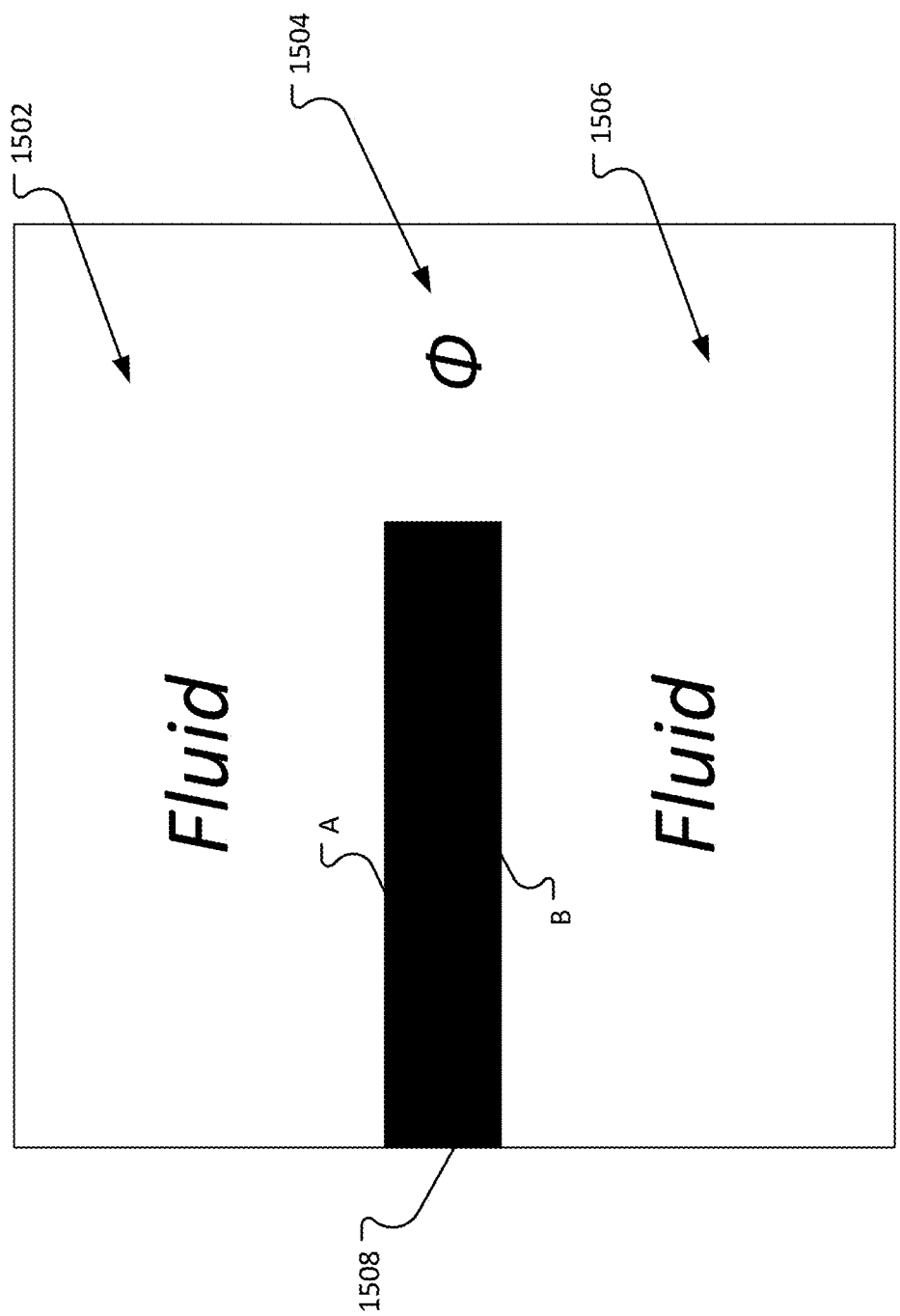

… (US 11,042,674 B2)

ACOUSTIC EFFECTS OF A MESH ON A FLUID FLOW

TECHNICAL FIELD

This description relates to computer simulation of physical processes, such as fluid flow and acoustics.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

SUMMARY

In one implementations, the description describes one or more processing devices and one or more hardware storage devices storing instructions that are operable, when executed by the one or more processing devices, to cause the one or more processing devices to perform operations including modeling the porous material as a two-dimensional interface, in a simulation space, in which fluid flows and sound waves travel through the porous material and experience pressure and acoustic losses. The operations also include simulating, in the simulation space, fluid flow and propagation of sound waves, the activity of the fluid being simulated so as to simulate movement of elements within the simulation space and across the interface, where the simulation of the movement of the elements across the interface is governed by the model.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations of the disclosure may include one or more of the following operations, alone or in combination. The operations may further identifying changes to the fluid flow and propagation of sound waves within the simulation space attributable to the interface. Generating the measure of the fluid flow across the interface may be determined based on geometrical and simulation characteristics of the porous material. Simulating the propagation of sound waves may include calculating a change in pressure from a first side of the interface to a second side of the interface. The operations may include determining the acoustic damping characteristics of the porous material based on the simulation. Simulating the fluid flow and propagation of sound waves ma include simulating the first side of the interface independently of the second side of the interface. Simulating the propagation of sound waves may include allowing unlimited fluid flow through one direction of the interface while limiting the fluid flow in the other direction based on the measure of the fluid flow across the interface. The porous material may be a mesh.

Some advantages of the systems described herein include simplified handling of the complex interface, exact satisfaction of conservation laws, and easy realization of specified fluid boundary conditions on interface.

BRIEF DESCRIPTION OF THE DRAWINGS

FIG. 15 is a schematic view of interface describing the mesh.

Like reference numbers and designations in the various drawings indicate like elements.

DETAILED DESCRIPTION

Figure 1:
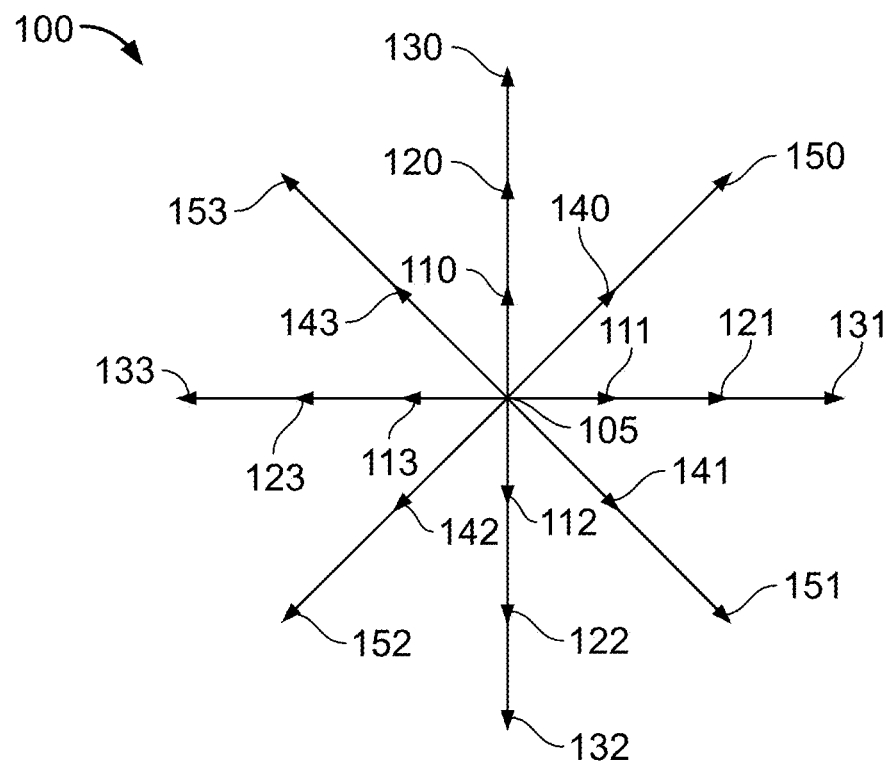
FIGS. 1 and 2 illustrate velocity components of two LBM models.

Airflow can be a cause of noise generation in an environment. One extreme case of noise caused by airflow is airframe noise. Airframe noise can be generated by the flow of air interacting with solid bodies causing a turbulent flow, for example, flows of air interacting with landing gears and lifting surfaces (such as slotted slaps, flaps side-edges, slat side-edges and cavities, flats and slat tracks, slat track cutouts, spoilers, and gear-wake/flap interactions). Airframe noise has been described as a lower bound in the amount of noise generated by an aircraft. That is, the airframe noise may define the minimum amount of noise that will be generated by an aircraft.

Different approaches have been used to attempt to reduce airframe noise, for example, streamlines fairings have been tested in wind-tunnel experiments. Fairings can be designed to redirect all airflow around an area or may be partially flow transparent (for example, made out of meshes or elastic cloth).

Noise caused by the flow of air can be reduced or eliminated using perforated or slotted sheets or panels of various materials including metal, wood, plastics or cardboard. These sheets or panels can be used as acoustic treatments to absorb sound and reduce noise generation. They can be of various thicknesses and shapes. They can be profiled or un-profiled and can be made curved to fit mounting on curved surfaces.

The effect of applying a perforated panel across a fluid flow region can be determined without fully resolving the actual fluid flow through the perforations. The same local effect of flow passing through the holes and generating both a hydrodynamic pressure drop and acoustic damping can be achieved through a model.

A. Volumetric Approach to Modeling Acoustic Absorption

Acoustic absorption, i.e., acoustic resistance, acoustic impedance, etc., by porous materials is an important topic in acoustics engineering. At a microscopic scale, the propagation of sound in porous media is difficult to characterize because of the topological complexity of the materials. At a macroscopic scale, porous materials with high porosity can be treated as regions of fluid which have modified properties relative to air. Sound propagation in such media can be expressed in the form of two intrinsic, frequency-dependent, and volumetric properties of the material: the characteristic impedance and the complex acoustic wave number. These properties may be modeled in different ways. For example, under certain assumptions, a given volumetric model for sound propagation in an absorbing material can be put in the form of a locally-reacting, frequency-dependent, complex impedance at the interface between two different media. Such impedance models may be used in approaches such as the Boundary Element Methods (BEM), the Finite Elements Methods (FEM), and the Statistical Energy Analysis (SEA) methods, and may be implemented as boundary conditions in the frequency domain.

For problems involving flow-induced noise, suitable Computational Fluid Dynamics (CFD) and/or Computational AeroAcoustics (CAA) numerical methods are non-linear and often time-explicit. For a time-explicit solution, time-domain surface impedance boundary conditions may allow modeling of acoustic absorption due to porous materials. However, even when a time-domain surface impedance formulation can be derived, stability and robustness may be challenging problems to overcome.

Another approach, which is described in more detail below, includes modeling of absorbing materials as volumetric fluid regions, such that sound waves travel through the material and dissipate via a momentum sink. This is analogous to the method for macroscopic modeling of flow through porous media achieved by relating the momentum sink to the flow resistance of the material following Darcy's law. For acoustic absorption modeling, there is the question of how to determine the momentum sink to achieve a desired absorption behavior. If the acoustic absorption is governed (or at least dominated) by the same physical mechanisms as the flow resistivity, then the same momentum sink behavior used to achieve the correct flow resistivity for a particular porous material should also achieve the correct acoustic absorption for that material. This approach may be applicable for any passive and homogeneous porous material. Moreover, the approach eliminates numerical stability problems since the impedance is realized in a way that satisfies passive, causal, and real conditions.

This volumetric modeling approach may be used in conjunction with a time-explicit CFD/CAA solution method based on the Lattice Boltzmann Method (LBM), such as the PowerFLOW system available from Exa Corporation of Burlington, Mass. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A porous media model is used to represent the flow resistivity of various components, such as air filters, radiators, heat exchangers, evaporators, and other components, which are encountered in simulating flow, such as through HVAC systems, vehicle engine compartments, and other applications.

A general discussion of a LBM-based simulation system is provided below and followed by a discussion of a volumetric modeling approach for acoustic absorption and other phenomena and a porous media interface model that may be used to support such a volumetric modeling approach.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4

$$f_i(x + c_i \Delta t, t + \Delta t) = f_i(x, t) - \frac{1}{\tau}[f_i(x, t) - f_i^{eq}(x, t)] \qquad \text{Eq. (4a)}$$

where $f_i^{eq}$ is known as the equilibrium distribution function, defined as:

$$f_i^{eq}(x, t) = \rho w_i \left[ 1 + \frac{\vec{c}_i \cdot \vec{u}}{T_0} + \frac{(\vec{c}_i \cdot \vec{u})^2}{2T_0^2} - \frac{u^2}{2T_0} + \frac{(\vec{c}_i \cdot \vec{u})^3}{6T_0^3} - \frac{(\vec{c}_i \cdot \vec{u})u^2}{2T_0^2} \right] \qquad \text{Eq. (4b)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
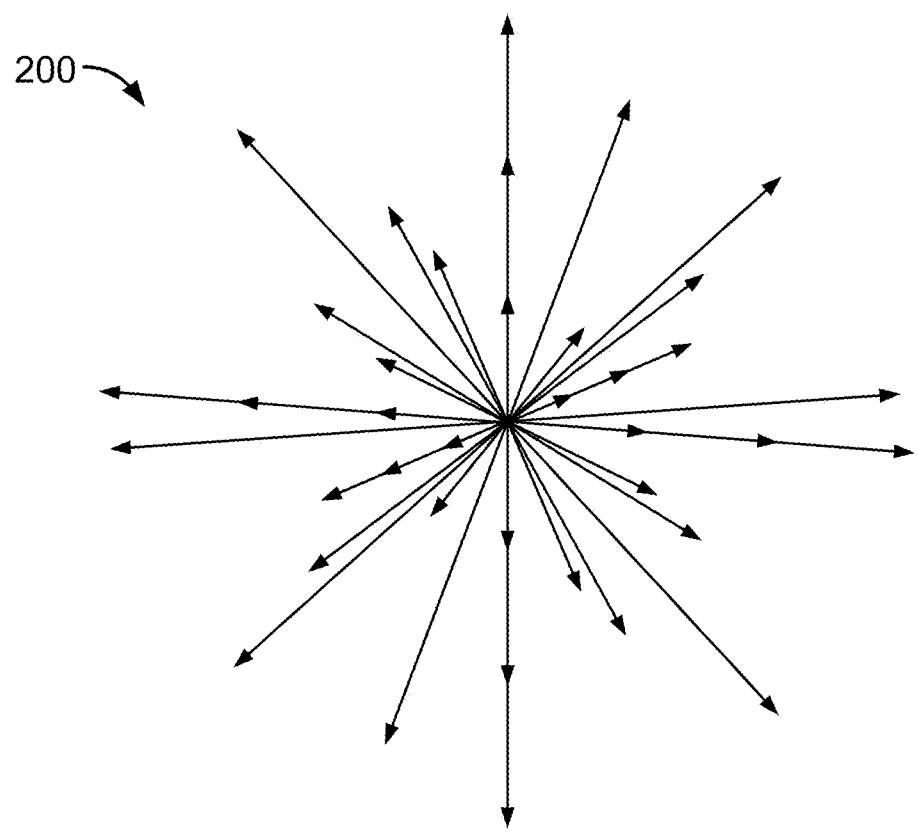

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
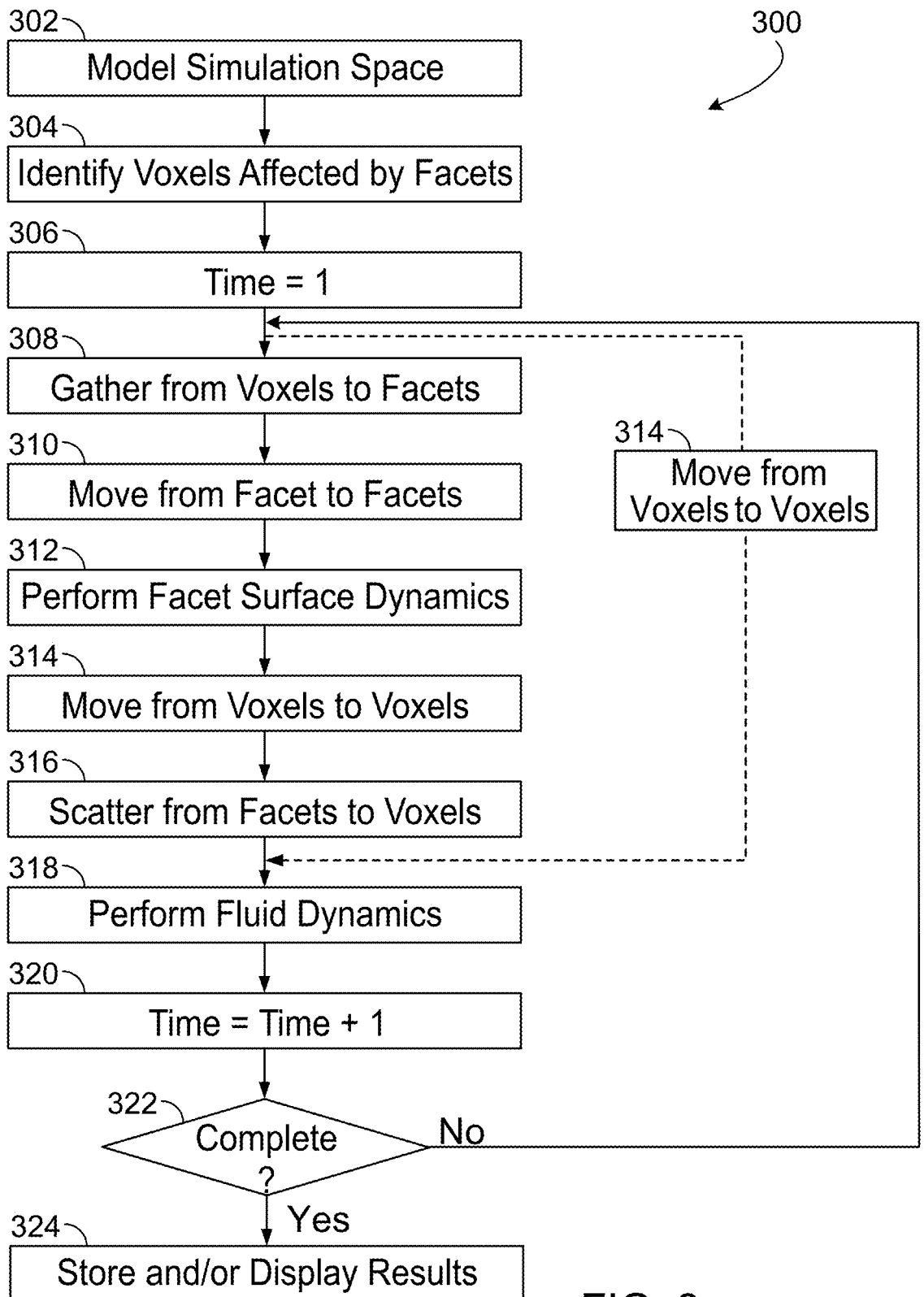
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw a micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v. \qquad \text{Eq. (5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i=(c_{i,x},c_{i,y},c_{i,z}). \qquad \text{Eq. (6)}$$

The energy level zero state represents stopped particles that are not moving in any dimension, i.e. $c_{stopped}=(0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
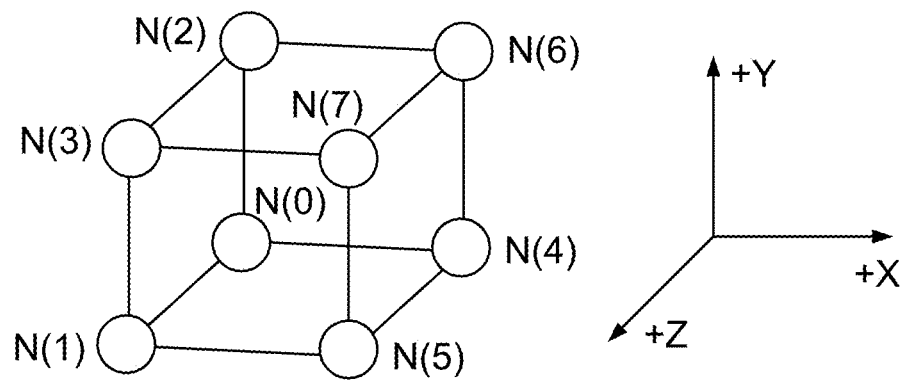
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 4.

Figure 5A:
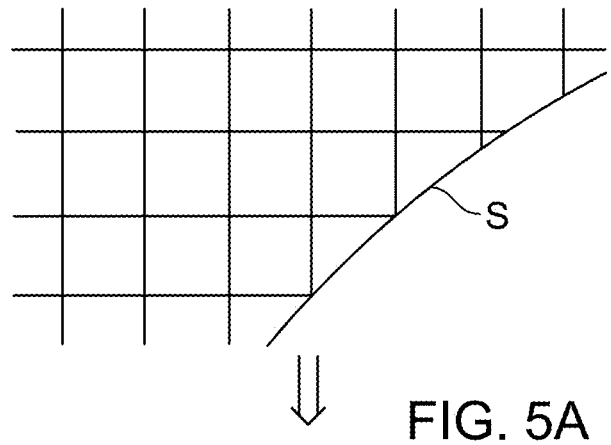
FIGS. 5A and 5B are illustrations of lattice structures used by the system of FIG. 3.
Figure 5B:
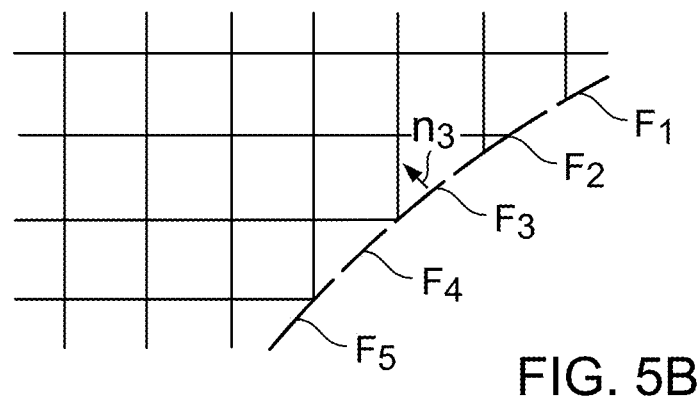

Referring to FIGS. 5A and 5B, a surface S (FIG. 5A) is represented in the simulation space (FIG. 5B) as a collection of facets $F_\alpha$:

$$S = \{F_\alpha\} \qquad \text{Eq. (7)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
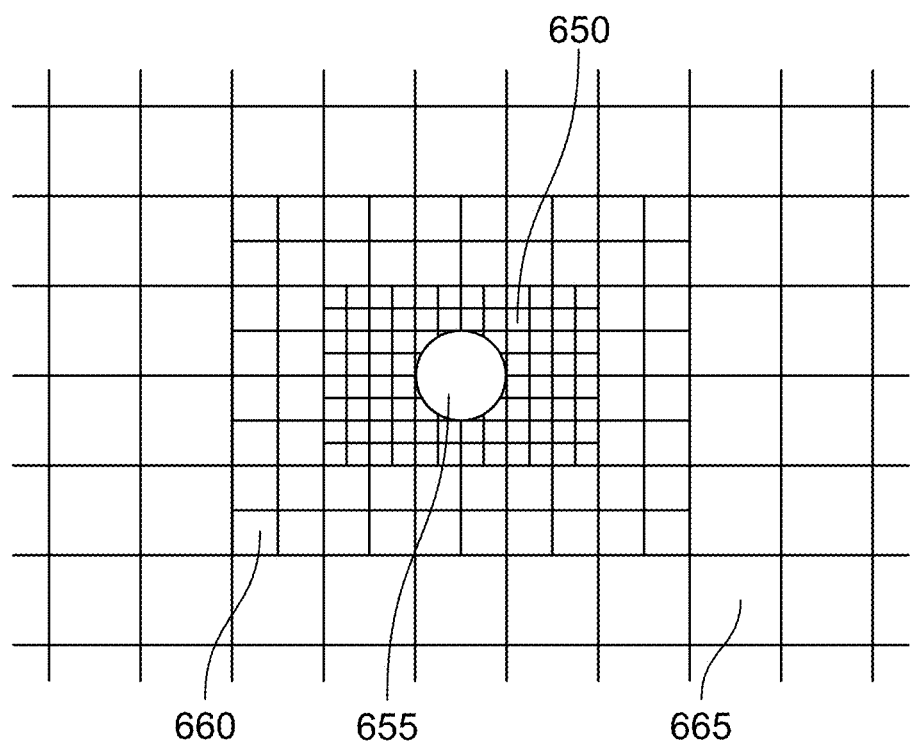
FIGS. 6 and 7 illustrate variable resolution techniques.
Figure 7:
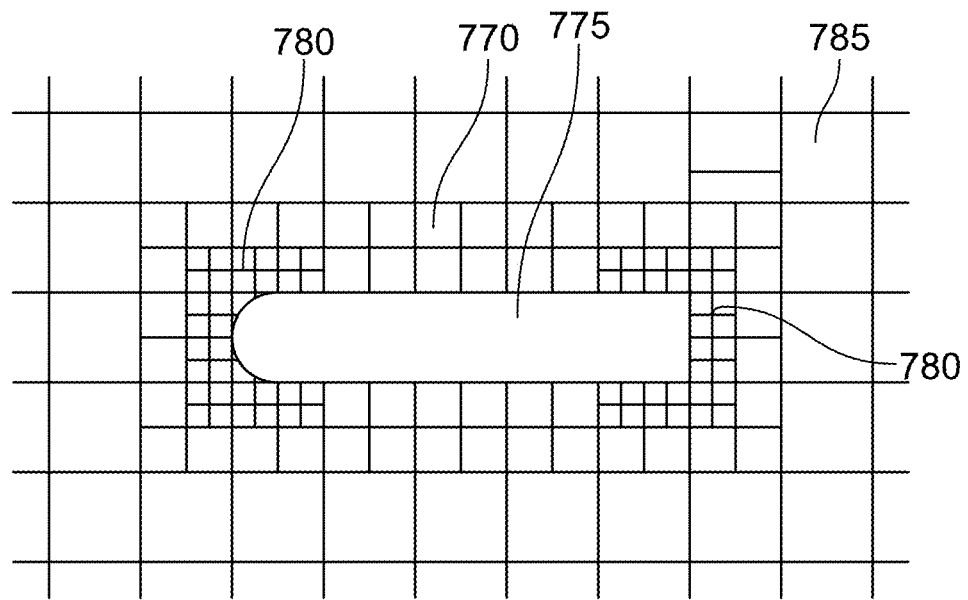

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
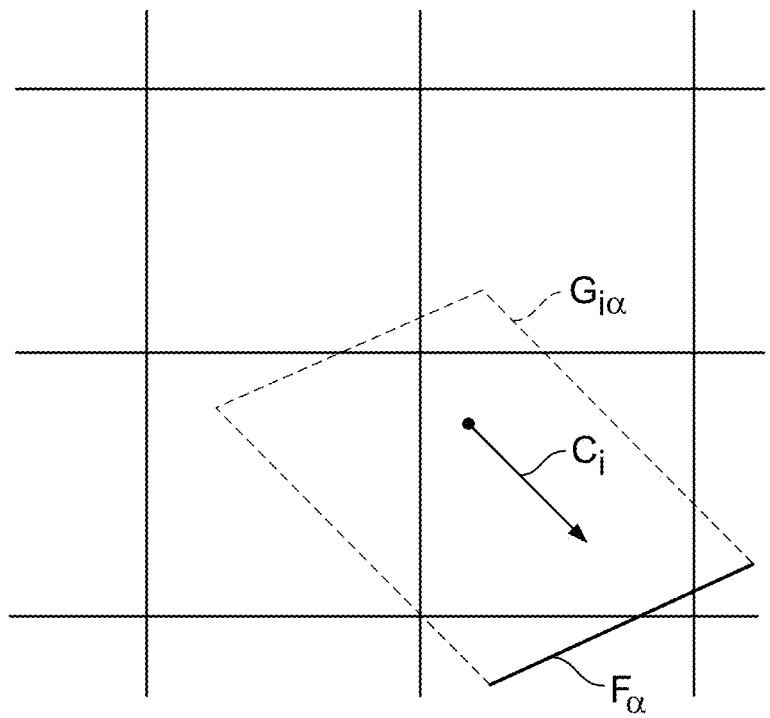
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq. (8)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \qquad \text{Eq. (9)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq. (10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (11)}$$

D. Perform Simulation

Once the voxels that are affected by one or more facets are identified (step 304), a timer is initialized to begin the simulation (step 306). During each time increment of the simulation (also referred to herein as a time step), movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal na of the facet (i.e., the tangential components) must be equal, while the difference between the components of the combined received and transferred momentums that are parallel to the normal na of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel N(x) and a facet $F_\alpha$ is:

$$\Gamma_{i\alpha}(x) = N_i(x) V_{i\alpha}(x). \qquad \text{Eq. (12)}$$

From this, for each state i directed toward a facet $F_\alpha(c_i n_\alpha < 0)$, the number of particles provided to the facet $F_\alpha$ by the voxels is:

$$\Gamma_{i\alpha V \to F} = \sum_X \Gamma_{i\alpha}(x) = \sum_X N_i(x) V_{i\alpha}(x) \qquad \text{Eq. (13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
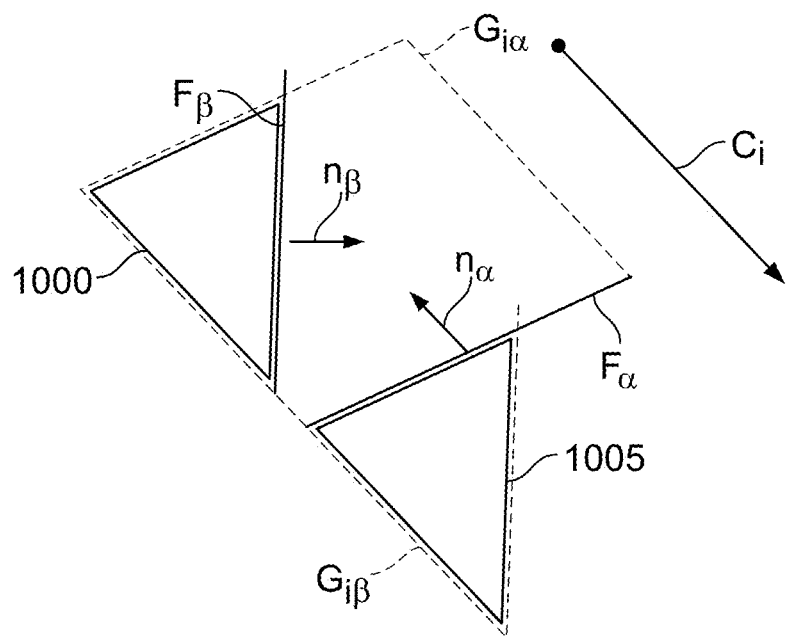
FIG. 10 illustrates movement of particles from a surface to a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta)/V_{i\alpha}. \qquad \text{Eq. (14)}$$

where $\Gamma_i(\beta, t-1)$ is a measure of the state i particles produced by the facet $F_\beta$ during the previous time increment. From this, for each state i directed toward a facet $F_\alpha(c_i n_\alpha < 0)$, the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta)/V_{i\alpha} \qquad \text{Eq. (15)}$$

and the total flux of state i particles into the facet is:

$$\Gamma_{iIN}(\alpha) = \qquad \text{Eq. (16)}$$

$$\Gamma_{i\alpha V \to F} + \Gamma_{i\alpha F \to F} = \sum_X N_i(x) V_{i\alpha}(x) + \sum_\beta \Gamma_i(\beta, t-1) V_{i\alpha}(\beta)/V_{i\alpha}$$

The state vector N(α) for the facet, also referred to as a facet distribution function, has 54 entries corresponding to the 54 entries of the voxel state vectors. The input states of the facet distribution function N(α) are set equal to the flux of particles into those states divided by the volume $V_{i\alpha}$:

$$N_i(\alpha) = \Gamma_{iIN}(\alpha)/V_{i\alpha}, \qquad \text{Eq. (17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha)/V \qquad \text{Eq. (18)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq. (19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
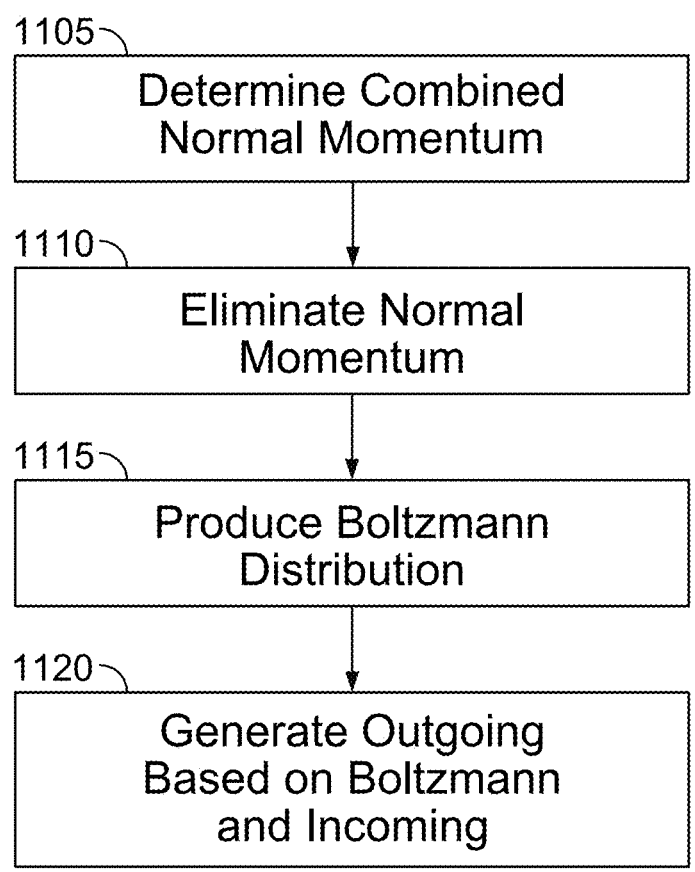
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum P(α) of the particles at the facet as:

$$P(\alpha) = \sum_i c_i * N_i^\alpha \qquad \text{Eq. (20)}$$

for all i. From this, the normal momentum $P_n(\alpha)$ is determined as:

$$P_n(\alpha) = n_\alpha \cdot P(\alpha). \qquad \text{Eq. (21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta \Gamma_i(\alpha) = \Gamma_{iIN}(\alpha) - N_{n-\beta i}(\alpha) V_{i\alpha}. \qquad \text{Eq. (22)}$$

Using this difference, the outgoing flux distribution is:

$$\Gamma_{iOUT}(\alpha) = N_{n-\beta i}(\alpha) V_{i\alpha} - \Delta \cdot \Gamma_{i*}(\alpha), \qquad \text{Eq. (23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\begin{aligned}\Gamma_{iOUT}(\alpha) = & N_{n-Bi}(\alpha) V_{i\alpha} - \Delta \Gamma_{i*}(\alpha) + C_f(n_\alpha \cdot c_i)[N_{n-Bi*}(\alpha) - \\ & N_{n-Bi}(\alpha)] V_{i\alpha} + (n_\alpha \cdot c_i)(t_{l\alpha} \cdot c_i) \Delta N_{j,1} V_{i\alpha} + (n_\alpha \cdot c_i)(t_{2\alpha} \cdot c_i) \\ & \Delta N_{j,2} V_{i\alpha}\end{aligned} \qquad \text{Eq. (24)}$$

for $n_\alpha c_i > 0$, where $C_f$ is a function of skin friction, $t_{l\alpha}$ is a first tangential vector that is perpendicular to $n_\alpha$, $t_{2\alpha}$ is a second tangential vector that is perpendicular to both $n_\alpha$ and $t_{l\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \qquad \text{Eq. (25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha) n_\alpha)/\rho, \qquad \text{Eq. (26)}$$

where $\rho$ is the density of the facet distribution:

$$\rho = \sum_i N_i(\alpha) \qquad \text{Eq. (27)}$$

As before, the difference between the incoming flux distribution and the Boltzmann distribution is determined as:

$$\Delta \Gamma_i(\alpha) = \Gamma_{iIN}(\alpha) - N_{n-\beta i}(\alpha) V_{i\alpha}. \qquad \text{Eq. (28)}$$

The outgoing flux distribution then becomes:

$$\Gamma_{iOUT}(\alpha) = N_{n-\beta i}(\alpha) V_{i\alpha} - \Delta \Gamma_{i*}(\alpha) + C_f(n_\alpha \cdot c_i)[N_{n-\beta i*}(\alpha) - N_{n-\beta i}(\alpha)] V_{i\alpha}, \qquad \text{Eq. (29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i, c_i \cdot n_\alpha > 0} c_i \Gamma_{i\alpha OUT} - \sum_{i, c_i \cdot n_\alpha < 0} c_i \Gamma_{i\alpha IN} = p_\alpha n_\alpha A_\alpha - C_f p_\alpha u_\alpha A_\alpha \qquad \text{Eq. (30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta \Gamma_{\alpha m j} = \sum_{i, c_{ji} \cdot n_\alpha < 0} \Gamma_{\alpha j i I N} - \sum_{i, c_{ji} \cdot n_\alpha > 0} \Gamma_{\alpha j i O U T} \qquad \text{Eq. (31)}$$

where the index j denotes the energy of the state i. This energy difference is then used to generate a difference term:

$$\delta \Gamma_{\alpha j i} = V_{i\alpha} \Delta \Gamma_{\alpha m j} \Big/ \sum_{i, c_{ji} \cdot n_\alpha < 0} V_{i\alpha} \qquad \text{Eq. (32)}$$

for $c_{ji} n_\alpha > 0$. This difference term is used to modify the outgoing flux so that the flux becomes:

$$\Gamma_{\alpha j i O U T f} = \Gamma_{\alpha j i O U T} + \delta \Gamma_{\alpha j i} \qquad \text{Eq. (33)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
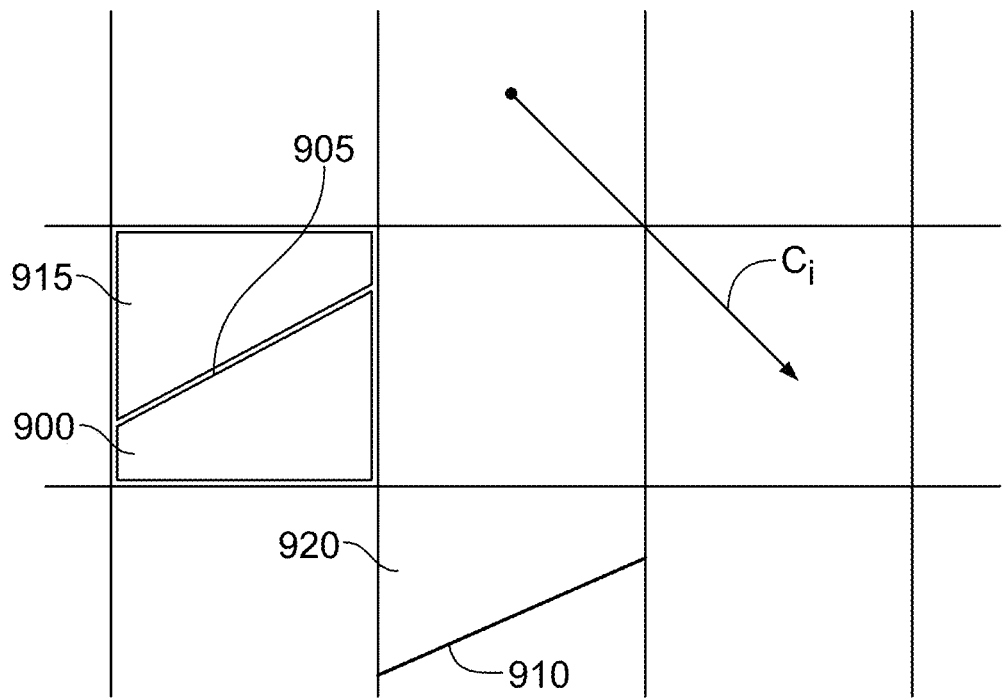
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel $N(f)$ occupied by one or more facets is:

$$N_i(f) = N_i(x)\left(1 - \sum_\alpha V_{i\alpha}(x)\right) \quad \text{Eq. (34)}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha iF \to V} = \frac{1}{P_f(x)} V_{\alpha i}(x) \Gamma_{\alpha iOUT_f} / V_{\alpha i} \quad \text{Eq. (35)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha iOUT_f} / V_{\alpha i} \quad \text{Eq. (36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Variable Resolution

Figure 12:
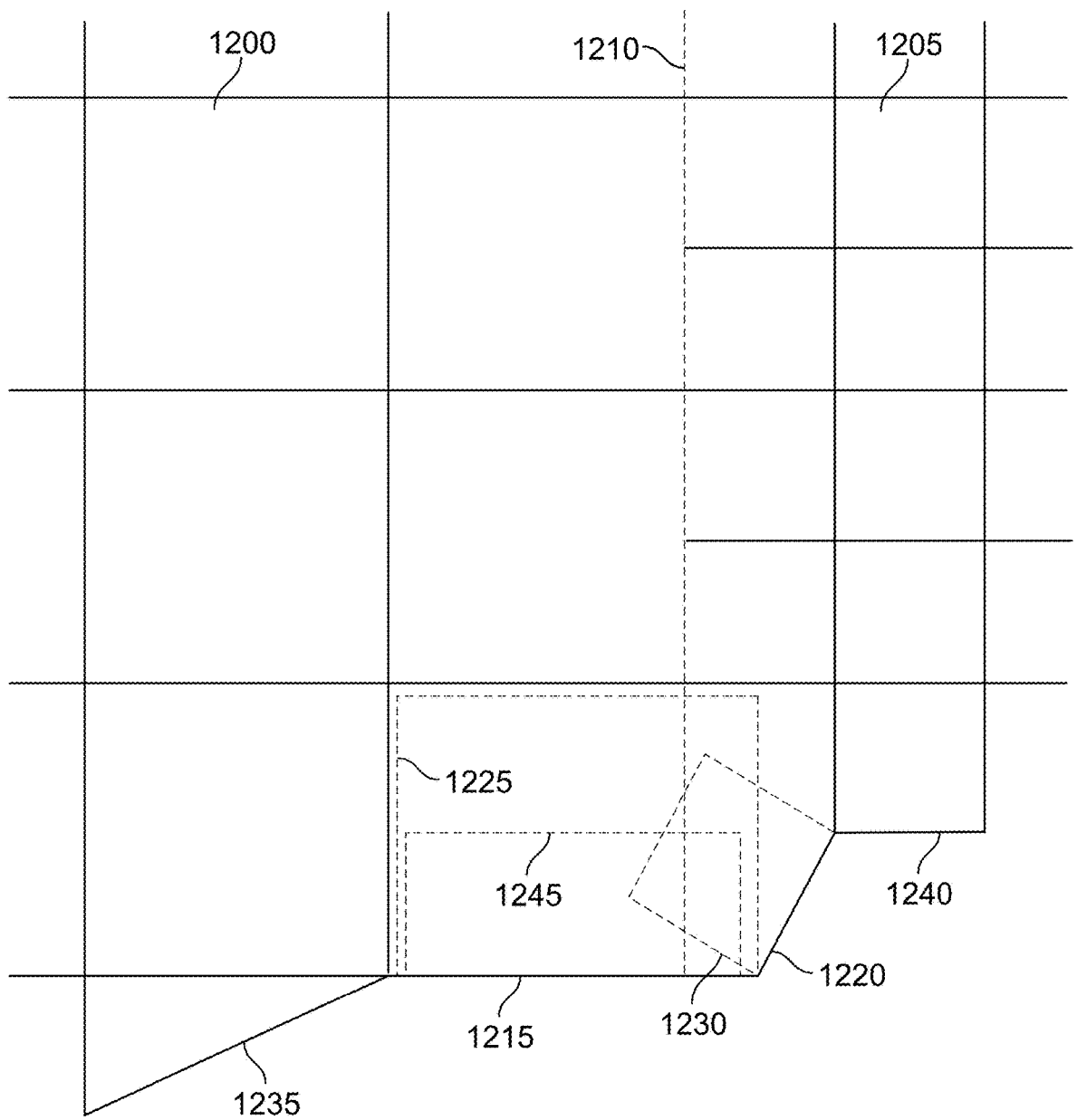
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 1200 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
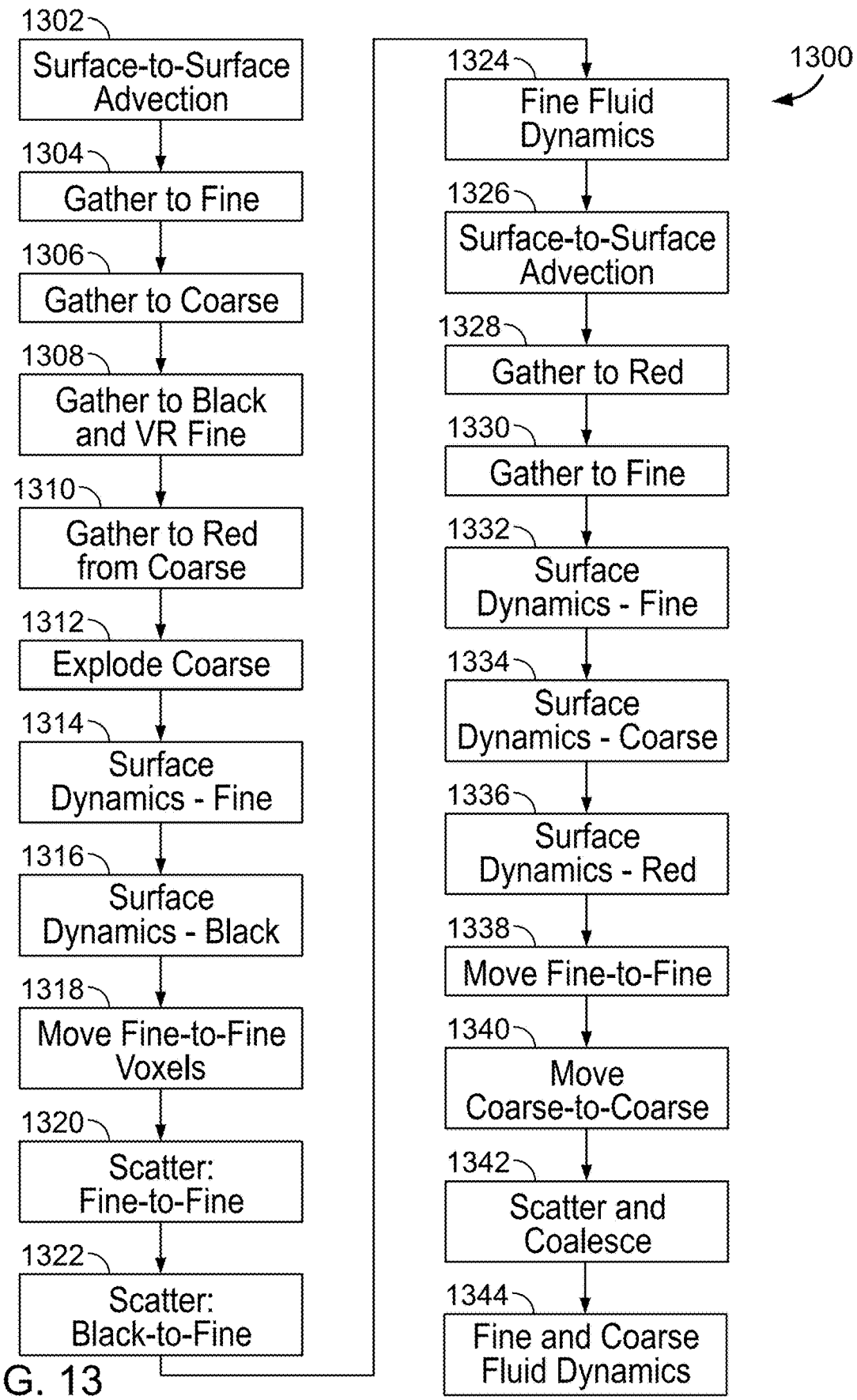
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha}=|c_i n_\alpha|A_\alpha. \quad \text{Eq. (37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha IRb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha IRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1334), and for the red facets $F_{\alpha ICr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

F. Mesh Modeling

Figure 14:
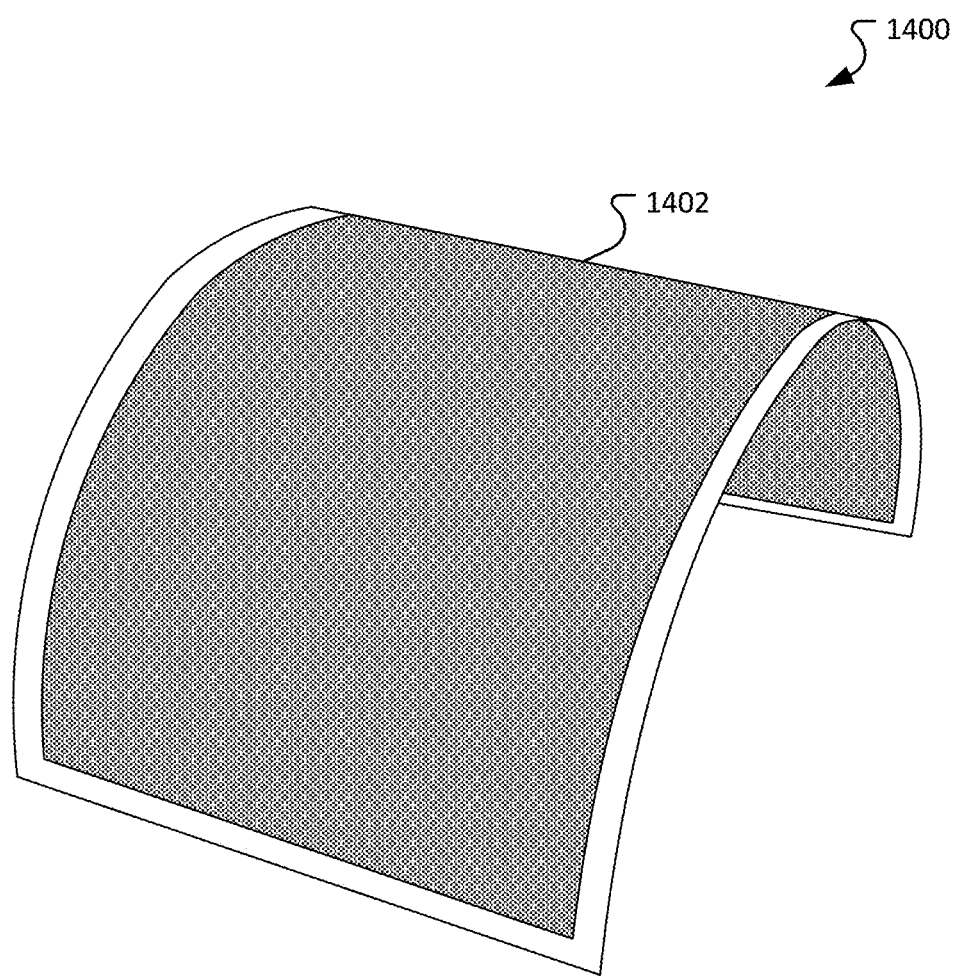
FIG. 14 is an illustration of a mesh.

As described above, noise generated by the flow of air around physical components can be reduced by the use a perforated sheets applied around the structure. FIG. 14 illustrates an example of a perforated sheet 1400. The perforations 1402 themselves can also be of different shapes and staggering on the surface so that the perforated pattern achieves a wide range of open to closed surface area ratios also reaching very small perforations. The sheets 1400 can be rigid or flexible so that they can be foldable like a textile fabric. In addition these sheets or panels are sometimes combined in a multilayer fashion with other acoustic damping materials (such as foams) to increase their noise reduction effect (not shown).

These perforated sheets can be installed on the surfaces that generate or reflect acoustic waves, hence corresponding to noise sources, in order to absorb these and overall reduce the noise perception for the surrounding environment. Large scale such as in rooms or on buildings as well as small scale installations such as around components of machinery can be found. In aerospace applications these installations are effective in reducing noise from several components such as high-lift devices and landing gears. They can be used e.g. as solid or flexible fairings (elastic membranes) around the landing gear components and doors.

Besides the three dimensional shape of the panel and independent of the material and composition there are a few measurable quantities that can be used to describe the performance and physical behavior of the sheets. The first set of measureable qualities can include geometric characteristics of the materials from which the panels are made, including, for example, the thickness of the panel, the porosity (e.g., ratio between open to closed area (or volume)), and the surface roughness. The second set of measurable qualities can include physical characteristics of the panel, including, for example, resistivity for a range of velocities, (e.g., the hydrodynamic pressure drop for a given velocity) and acoustic impedance (e.g., the acoustic pressure damping resulting in an acoustic absorption of as a function of frequency). In general, the physical characteristics may be described for the normal direction perpendicular to the panel surface.

Provided both geometrical and physical characteristics of the perforated panel are available a simulation can use these to fully model the hydrodynamic and acoustic behavior of fluid flowing around the panels without fully resolving the actual fluid flow through the perforations. The same local effect of flow passing through the holes and generating both a hydrodynamic pressure drop and acoustic damping can be achieved through a model. The model collapses the geometrical and physical characteristics into a measure, $\Phi$, representing a fraction of the fluid that can flow from one side of the interface to the other side of the interface at every given time.

Referring to FIG. 15, as described above, a mesh 1508 affecting the fluid flow across a fluid flow region 1502, 1506 may be modeled as a two dimensional interface 1508 crossing the fluid flow region 1502, 1506. In general, a two dimensional interface is an interface that may have length and width (and shape) but no depth/thickness (or an insignificant depth/thickness). For example, the two-dimensional interface may form a plane, a curve, a cylinder, or any other shape.

Modeling the mesh as a two-dimensional interface enables a more efficient computer simulation of the fluid flow region. The complexity inherent in modeling the mesh is reduced to a barrier that enables fluid across the boundary based on the measure $\Phi$. In this manner, the computer processor performs the simulation more efficiently reducing the processor and memory requirements to perform the simulation.

A system may account for example for a surface porosity $\phi$1504, which represents a situation where a thin sheet with small holes crosses the fluid flow region. The flow is partially blocked from both sides. Given a physical model collapsing the geometrical parameter $\phi$ into the measure $\Phi$, a $\Phi$ fraction of the fluid from the first side 1502 can flow to the second side 1506 and the $\Phi$ fraction of the fluid from the second side 1506 can flow to the first side 1502. The mass flux still satisfies the conservation condition at the interface 1508. If $\phi=1$, this interface reduces to not being present.

This surface porosity introduces a degree of freedom for modeling of interface properties. One (and not the only one) of the immediate applications is noise reduction of airplane wings partially covered by thin sheet with small holes for acoustic damping. Additional parameters can be introduced in the model to add degrees of freedom for modeling of the interface properties (such as interface thickness, hole diameters, etc).

The interface 1508 (e.g. a mesh sheet) can be described by so-called double-sided surface elements (i.e., surfels. In such double-sided surfels, a set of paired surfels S form a double-layered surface having an inner surface A and outer surface B. The inner surface A interacts with the first side 1502 and the outer surface B interacts with second side 1506. There is no gap between the inner and outer surfaces A and B. For convenience of computation, each inner surfel has the exact same shape and size as its paired outer surfel, and each inner surfel is only in touch with the paired outer surfel. The standard surfel gather and scatter scheme is performed on each side of the surface A, B, and with the condition that the $\Phi$ fraction of incoming particles from the first side 1502 pass through to the second side 1506 while all of the incoming particles $\Phi$ from the second side 1506 pass through to the first side 1502. Advantages of this approach include simplified handling of the complex interface, exact satisfaction of conservation laws, and easy realization of specified fluid boundary conditions on interface.

This approach, in effect, introduces an interface resistance which is not proportional to an interface thickness and therefore cannot be included in approximation of Darcy's law. The approach accounts for the flow details at the interface and improves simulation results of certain types of flow problems, such as the modeling of acoustic absorption.

Using the approach, the pressure on the first side 1502 of the interface 1508 can be determined to be different than the pressure on the second side 1506 of the interface 1508. As air passes from the first side 1502 of the interface to the second side 1508 of the interface 1508, the pressure on the second side 1508 increases. During a simulation, this effect can be calculated using the fluid flow from voxels on one side of the interface to voxels on the second side of the interface. The flow of across the interface can be used to calculate both acoustic effects and changes in the fluid flow.

Modeling different perforated sheets can be performed by modifying the inputs into the model to calculate Φ.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for determining fluid flow and propagation of sound waves through a three dimensional porous material, the system comprising:
   a processor and a memory being configured to perform operations comprising:
      receiving by the system, a model of the three dimensional porous material;
      modeling the three dimensional porous material as a two-dimensional interface sheet defined as having a width and a length that define an arbitrary shape, in which fluid flows and sound waves travel through the modeled two-dimensional interface sheet in a simulation space, and experience pressure and acoustic losses; and
      simulating in the simulation space, fluid flow and propagation of sound waves, with the fluid flow being simulated so as to simulate movement of elements of the fluid flow within the simulation space and across the modeled two-dimensional interface, where simulation of the movement of the elements across the modeled two-dimensional interface, occurs according to the modeled two-dimensional interface.

2. The system of claim 1, wherein the operations further comprise identifying changes to the fluid flow and propagation of sound waves within the simulation space attributable to the interface.

3. The system of claim 1, wherein the operations further comprise:
   generating a measure representing a fraction of the fluid flow from one side of the modeled two-dimensional interface across to the other side of the modeled two-dimensional interface, which measure is determined based on geometrical and simulation characteristics of the porous material.

4. The system of claim 3, wherein the modeled two-dimensional interface model represents a mesh sheet, and the modeled two-dimensional model reduces modeling of the mesh sheet to a barrier that enables fluid across a boundary based on the measure that is defined as $\Phi$ that represents collapsing a geometric parameter $\varphi$ into a fraction of the fluid that can flow from one side of the interface to the other side of the interface at a given time.

5. The system of claim 1, wherein simulating the propagation of sound waves comprises calculating a change in pressure from a first side of the modeled two-dimensional interface to a second side of the modeled two-dimensional interface.

6. The system of claim 1, further comprising, determining the acoustic damping characteristics of the porous material based on the simulation.

7. The system of claim 1, wherein simulating the fluid flow and propagation of sound waves comprises simulating the first side of the modeled two-dimensional interface independently of the second side of the modeled two-dimensional interface.

8. The system of claim 1, wherein the three dimensional porous material is a mesh sheet, with the modeled two-dimensional interface including a set of double-sided surface elements that form a double-layered surface having an inner surface that interacts with and contacts an outer surface of the mesh sheet.

9. A computer-implemented method for determining fluid flow and acoustics through a three dimensional porous material, the method comprising:
   receiving by the system, a model of the three dimensional porous material modeled as a two-dimensional interface sheet defined as having a width and a length that define an arbitrary shape, in which fluid flows and sound waves travel through the modeled two-dimensional interface in a simulation space, and experience pressure and acoustic losses; and
   simulating in the simulation space, fluid flow and propagation of sound waves, with the fluid flow being simulated so as to simulate movement of elements of the fluid flow within the simulation space and across the modeled two-dimensional interface, where simulation of the movement of the elements across the modeled two-dimensional interface, occurs according to the modeled two-dimensional interface.

10. The computer-implemented method of claim 9, wherein the operations further comprise identifying changes to the fluid flow and propagation of sound waves within the simulation space attributable to the modeled two-dimensional interface.

11. The computer-implemented method of claim 9, further comprises:
   generating a measure representing a fraction of the fluid flow from one side of the modeled two-dimensional interface across to the other side of the modeled two-dimensional interface, which measure is determined based on geometrical and simulation characteristics of the porous material.

12. The computer-implemented method of claim 11, wherein the modeled two-dimensional interface model represents a mesh sheet, and the modeled two-dimensional model reduces modeling of the mesh sheet to a barrier that enables fluid across a boundary based on the measure that is defined as $\Phi$ that represents collapsing a geometric parameter $\varphi$ into a fraction of the fluid that can flow from one side of the interface to the other side of the interface at a given time.

13. The computer-implemented method of claim 9, wherein simulating the propagation of sound waves comprises calculating a change in pressure from a first side of the interface to a second side of the modeled two-dimensional interface.

14. The computer-implemented method of claim 9, further comprising, determining the acoustic damping characteristics of the porous material based on the simulation.

15. The computer-implemented method of claim 9, wherein simulating the fluid flow and propagation of sound waves comprises simulating the first side of the modeled two-dimensional interface independently of the second side of the modeled two-dimensional interface.

16. The computer-implemented method of claim 9, wherein the three dimensional porous material is a mesh sheet, with the modeled two-dimensional interface including a set of double-sided surface elements that form a double-layered surface having an inner surface that interacts with and contacts an outer surface of the mesh sheet.

17. A non-transitory computer storage medium encoded with computer program instructions that when executed by one or more computers cause the one or more computers to perform operations comprising:
receiving by the system, a model of the three dimensional porous material modeled as a two-dimensional interface sheet defined as having a width and a length that define an arbitrary shape, in which fluid flows and sound waves travel through the modeled two-dimensional interface in a simulation space, and experience pressure and acoustic losses; and
simulating in the simulation space, fluid flow and propagation of sound waves, with the fluid flow being simulated so as to simulate movement of elements of the fluid flow within the simulation space and across the modeled two-dimensional interface, where simulation of the movement of the elements across the modeled two-dimensional interface, occurs according to the modeled two-dimensional interface.

18. The non-transitory computer storage medium of claim 17, wherein the operations further comprise identifying changes to the fluid flow and propagation of sound waves within the simulation space attributable to the modeled two-dimensional interface.

19. The non-transitory computer storage medium of claim 17, wherein the operations further comprise:
generating a measure representing a fraction of the fluid flow from one side of the modeled two-dimensional interface across to the other side of the modeled two-dimensional interface, which measure is determined based on geometrical and simulation characteristics of the porous material.

20. The non-transitory computer storage medium of claim 17, wherein simulating the propagation of sound waves comprises calculating a change in pressure from a first side of the modeled two-dimensional interface to a second side of the modeled two-dimensional interface.

21. The non-transitory computer storage medium of claim 17, wherein the operations further comprise determining the acoustic damping characteristics of the porous material based on the simulation.

22. The non-transitory computer storage medium of claim 17, wherein simulating the fluid flow and propagation of sound waves comprises simulating the first side of the modeled two-dimensional interface independently of the second side of the modeled two-dimensional interface.

23. The non-transitory computer storage medium of claim 17, wherein the modeled two-dimensional interface model represents a mesh sheet, and the modeled two-dimensional model reduces modeling of the mesh sheet to a barrier that enables fluid across a boundary based on the measure that is defined as $\Phi$ that represents collapsing a geometric parameter $\varphi$ into a fraction of the fluid that can flow from one side of the interface to the other side of the interface at a given time.

24. The non-transitory computer storage medium of claim 17, wherein the porous material is a mesh sheet.

* * * * *